United States Patent

[11] 3,564,972

| [72] | Inventors | Donald Firth<br>Glasgow;<br>Sinclair Upton Cunningham; Ronald<br>Graham McIntyre, Glasgow, Scotland |
|---|---|---|
| [21] | Appl. No. | 714,504 |
| [22] | Filed | Mar. 20, 1968 |
| [45] | Patented | Feb. 23, 1971 |
| [73] | Assignee | National Research Development<br>Corporation<br>London, England |
| [32] | Priority | Mar. 28, 1967 |
| [33] | | Great Britain |
| [31] | | 14110/67 |

[54] MACHINE TOOLS
9 Claims, 3 Drawing Figs.

[52] U.S. Cl................................................ 90/20,
90/15, 90/21.5, 90/56, 29/27, 29/51, 29/564,
77/64, 82/2
[51] Int. Cl..................................................... B23c 1/14,
B23b 7/06

[50] Field of Search........................................ 90/11, 20,
21, 56, 15.1, 21.5; 51/123, 232, 95.1; 82/2.6, 45,
3; 29/51, 563, 564, 26, 27; 77/(Inquired)

[56] References Cited
UNITED STATES PATENTS

| 150,416 | 5/1874 | Hawkins...................... | 90/20X |
| 2,247,582 | 7/1941 | Kraus........................... | 90/20 |
| 2,957,362 | 10/1960 | Kelm............................ | 90/20X |
| 3,180,187 | 4/1965 | McFerren..................... | 82/2-16X |
| 3,245,290 | 4/1966 | Johansson.................... | 82/3 |
| 3,456,533 | 7/1969 | Firth et al. ................... | 82/2 |

Primary Examiner—Gil Weidenfeld
Attorney—Larson, Taylor & Hinds

ABSTRACT: A machine tool has a work holder mounted on a transverse slide carried by a fully rotatable member which is also axially adjustable. A range of fixed tools are located at intervals round the work holder.

MACHINE TOOLS

This invention relates to improvements in machine tools, in which relative movement between a workpiece and a tool is required first to remove material from the workpiece and secondly to determine the part of the workpiece from which the material is removed.

Thus in one group of machine tools, including the lathe, the workpiece is continuously rotated about the machine axis to produce the material-removing-action and the tool is moved axially of the machine axis and radially of the machine axis to determine the part of the workpiece from which the material is removed.

In a second group of machine tools, including the milling machine, the tool is continuously rotated about an axis to produce the material-removing-action and relative movement between the workpiece and the machine axis is used to determine the part of the workpiece from which the material is removed.

In both these groups of machines, it is necessary to provide at least two dimensional relative movement between the workpiece and the machine axis in a plane normal to the machine axis, and usually additional movement in a direction parallel to the machine axis is also required. These two or three movements are commonly carried out in mutually perpendicular axes by the use of slides operating in linear guideways. To position a given point on the workpiece relative to the machine axis, whether the tool axis is moved or the workpiece is moved, will usually require movements in both of two mutually perpendicular directions.

An object of the present invention is the provision of an improved machine tool in which relative movement between a machine axis and the workpiece is effected in a simple manner suited to automatic control.

According to one aspect of the present invention, a machine tool includes workpiece support means mounted on an intermediate member carried by a member rotatably mounted in a housing, the intermediate member being so mounted on the rotatable member that it is adjustable during use of the machine tool in a diametrical direction across the rotatable member. Preferably a plurality of tools or tool holding means are distributed about the workpiece support means at different angular positions.

In a preferred embodiment of the invention, the workpiece support means are arranged for continuous rotation about an axis which is parallel to the axis of rotation of the rotatable member to cause the removal of material from the workpiece by a selected one of the tools, so that the diametrical movement of the intermediate member varies the radial distance between the machine axis and the part of the workpiece being acted upon by the tool.

Preferably, the workpiece support means include clamping means by which the workpiece can be releasably clamped to the intermediate member.

Preferably, the intermediate member is fully adjustable across the entire diameter of the rotatable member so that an operation can be carried out across the full width of the workpiece by a continuous diametrical movement of the intermediate member.

Preferably, the workpiece is rotated by a hydraulic swash plate motor or ball motor.

The invention will now be described, by way of example, with reference to the accompanying drawings, in which.

Figure 1:
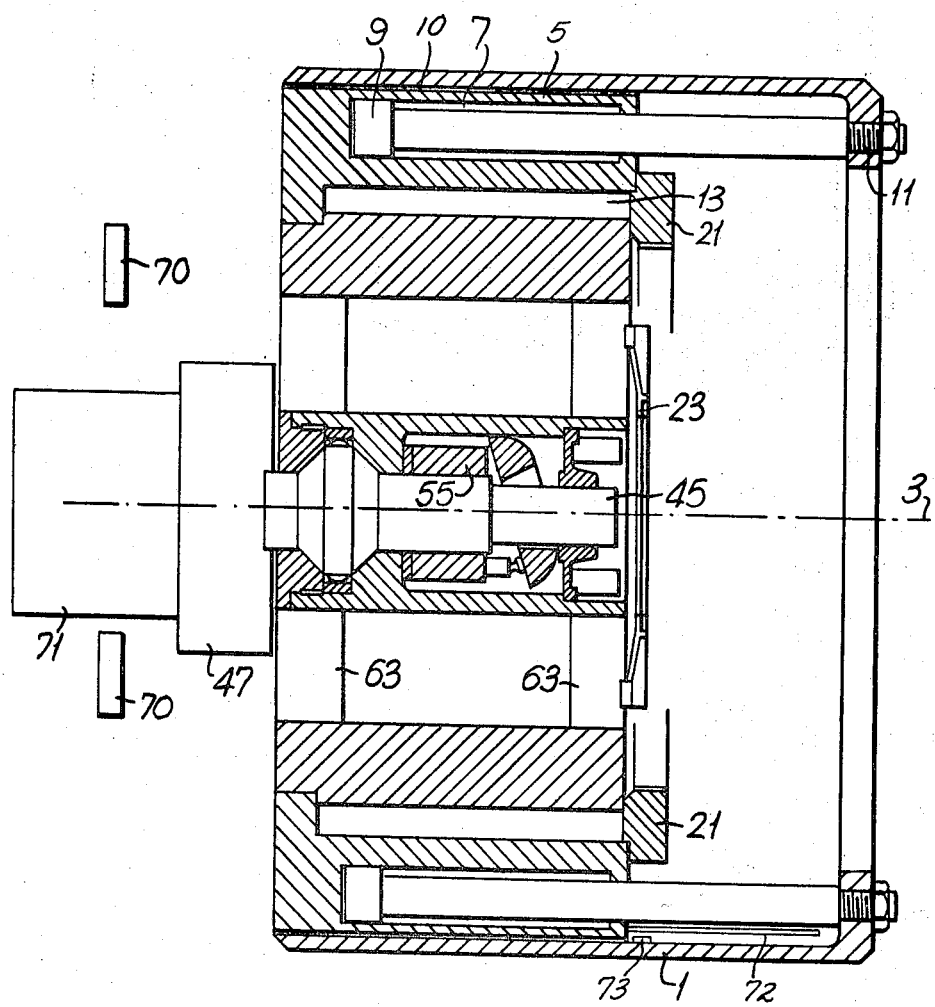
FIG. 1 is a sectional plan view through a machine tool taken on the line I-I of FIG. 2.
Figure 2:
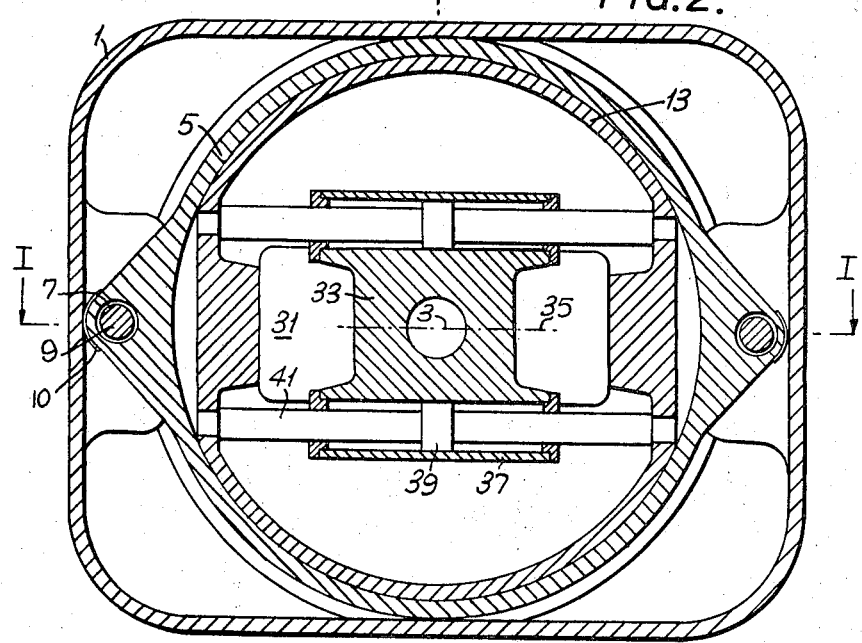
FIG. 2 is a sectional end elevation of the machine shown in FIGS. 1 and 3 taken on the line II-II of FIG. 3 and as viewed in the direction indicated by the arrows.
Figure 3:
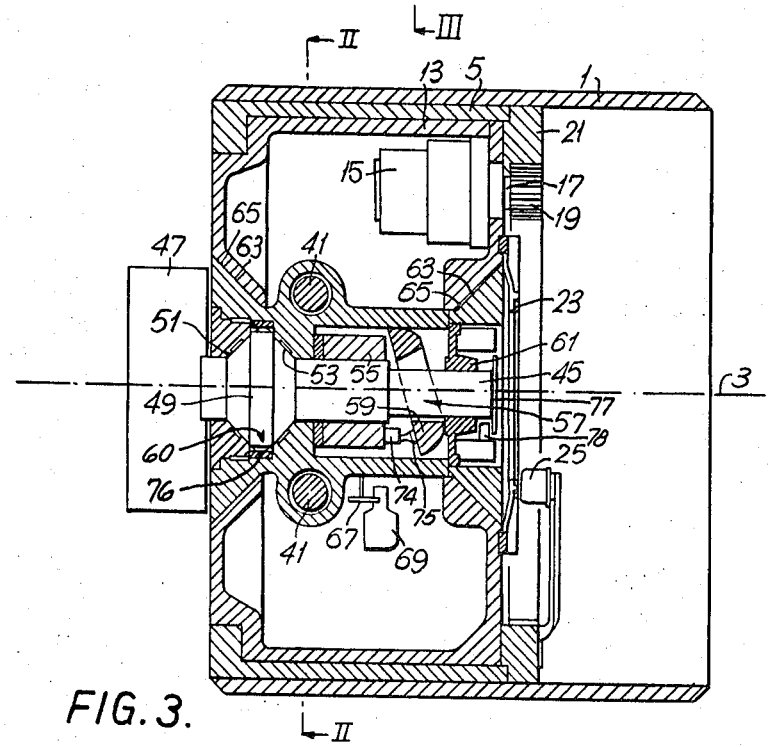
FIG. 3 is a sectional front elevation taken on the line III-III of FIG. 2 and as viewed in the direction indicated by the arrows.

The machine includes an outer casing 1 having a horizontal axis 3 and of substantially rectangular cross section but having suitably rounded corners to facilitate its manufacture as a casting. Disposed within the casing 1 is a cylindrical intermediate housing 5 having along each of its sides a cylinder 7 into which extends a piston ram 9 attached at its rearward end to an end wall 11 of the outer casing 1. Linear oil hydrostatic bearings 10 support and constrain the movement of the intermediate housing 5 in the outer casing. A linear transducer 72 is mounted on the intermediate casing and is scanned by a pickup head 73 located on the outer casing 1 to provide means for monitoring both position and velocity. It will be seen that the rams 9 are double acting pistons, so that the intermediate housing can be forcibly displaced relative to the outer housing, and then held firmly in a desired position.

Rotatably mounted in the intermediate housing 5 is a cylinder 13 in the rearward end of which is mounted a hydrostatic motor 15 having an output shaft 17 on which is mounted a spur gear wheel 19 arranged to engage a gear ring 21 carried by the intermediate housing 5 and concentric with the cylinder 13. Thus the motor 15 can be used to rotate the cylinder 13 in a clockwise or an anticlockwise direction as required relative to the intermediate housing 5, and then is effective to maintain this relative positioning. An annular optical grating 23 is carried by the rear end of the cylinder 13 and cooperates with an optical reading head 25 carried by the intermediate housing 5 to provide as the electrical output from the head 25 a signal indicative of the orientation and rate of angular translation of the cylinder to the intermediate housing.

The cylinder 13 is formed with a diametrically extending central aperture 31 in which is disposed a spindle housing 33 formed on each side of the diametrical axis 35 with a double acting cylinder 37 in which is disposed a piston 39 mounted on a spindle 41 which is mounted at each end in the cylinder 13. Thus the two cylinders can be utilized to move the spindle housing 33 bodily in the direction of the axis 35 and to hold that spindle housing in its adjusted position.

The spindle housing 33 carries a spindle 45 which at one end carries a chuck 47 and which near this end is formed with a radial enlargement 49 having two annular surfaces 51 and 53 each inclined to the spindle axis at an angle of 45 degrees and cooperating with complementary surfaces provided in the spindle housing to position the spindle both radially and axially. The bearing surfaces are provided with hydrostatic bearings which provide effective location of the spindle with only little friction. Towards its other end the spindle 45 carries the cylinder block 55 of a swash plate hydraulic motor 57, the pistons 74 of which through their slipper pads 75 engage a swash plate 59 supported by the spindle housing 33. The radial enlargement 49 is formed about its periphery with the cylinders of a multilobe ball motor 60, the balls of which engage a surrounding cam track 76. By the motor 57 and the motor 60 the spindle 45 can be driven at a desired steady speed to produce rotation of the chuck 47 and thus of a workpiece mounted in the chuck. This second end of the spindle is carried in a hydrostatic journal bearing 61 mounted in the cylinder 13. The ball motor 60 has two functions: (a) it supplies the lower part of the rotational spectrum of the chucking unit; (b) angularly positions and velocity controls the workpiece for such operations as side milling and drilling. One example of a combination of a ball motor and a swash plate motor in the drive for a machine tool workpiece is described in more detail in copending U.S. Pat. No. application Ser. No. 699,410, filed Jan. 22, 1968.

The spindle housing 33 is provided along two sides which extend parallel to the diametrical axis 35 with slideway surfaces 63, which cooperate with complementary surfaces 65 on the cylinder 13. These slideway surfaces are provided with hydrostatic oil bearings which provide axial and radial location of the spindle 45 with only little friction. The spindle housing 33 also carries an optical grating 67 which cooperates with a reading head 69 carried by the cylinder 13 to provide as the output from the reading head 69 an electrical signal indicative of the relative positions of the spindle housing and the cylinder in the relevant diametral direction of axis 35.

A rotational transducer 77 mounted on the spindle 45 and monitored by a head 78 attached to the housing provides positional and velocity information regarding the workpiece 71.

As shown in FIG. 1, six tool holders 70 are disposed at different angular orientations about the central axis of the cylinder 13 in a position lengthwise of the outer casing 1 in which they can be utilized to carry out machining operations on a workpiece 71 mounted in the chuck 47. Four of the tools are turning tools. One is a milling attachment. The sixth is a drilling attachment.

In use of the machine tool shown, the cylinder 13 is rotated by the hydrostatic motor 15 to align the diametrical axis of the cylinder 13, as indicated by the output from the reading head 25, with the tool to be used. The cylinders 7 are then supplied with hydraulic fluid as necessary in order to displace the intermediate housing 5 and thus the workpiece 71 axially of the machine to bring the proper part of the workpiece opposite the tool. The swash plate motor 57 or the ball motor 60 is used to rotate the workpiece 71 at a speed which will give the proper cutting speed, and the double-acting cylinders 37 are then supplied with hydraulic fluid in such a manner as to move the workpiece 71 radially towards the selected turning tool. The depth of cut is determined by the radial positioning of the workpiece 71, and the axial rate of movement of the workpiece relative to the tool is controlled by the action of the cylinder 7.

By controlling the spindle housing 33 and the intermediate housing 5 in a continuous manner to control radial setting and angular setting respectively, the path of the workpiece center can be constrained to describe chordal movements in the transverse plane. Thus operations such as side milling, drilling and tapping can be carried out by the machine using the milling tool or the drilling tool as appropriate. During chordal traversing, a further axis has to be brought into operation to offset the induced rotational motion of the component. This is achieved by controlling the ball motor incorporated in the headstock drive for velocity and position. The velocity control also allows constant peripheral cutting speed, while facing, to be a feature of this machine.

It will be seen that the selection of the tool to be used is simply controlled by rotation of the cylinder 13 by the motor 15 utilizing positional information provided by the reading head 25. The depth of the radial cut is simply controlled by the action of the cylinders 37 and utilizing positional information provided by the reading head 69.

Thus three controls are involved, and each is quite separate from the others and of a kind which readily lends itself to the application of a control system such as a point-to-point numerical control or a continuous path control.

The arrangement of motor 15 and gear wheel 19 and gear ring 21 necessitates the use of a relatively expensive antibacklash gearing. A cheaper alternative is to use an integrated ball motor drive, i.e. the direct drive motor can be either of the normal multilobe type or of the segmental configuration type.

As regards the linear and rotary transducers mentioned, these could be replaced if desired with other transducers of the inductosyn or helixyn mode of operation.

I claim:
1. A machine tool comprising:
   a housing;
   a first member rotatably adjustably mounted in said housing;
   a second member diametrically adjustably mounted in said first member and adjustable by translation along a diameter of said first member relative to the axis of rotation of the latter;
   a workpiece support rotatably mounted in said second member;
   limit stop means to limit the range of diametral adjustment of said second member at two points with said workpiece support on respectively opposite sides of the axis of rotation of said first member; and
   rotary drive means coupled to said workpiece support and mounted on said second member for rotating said workpiece support.
2. A machine tool according to claim 1 comprising first transducer means for determining the position of said workpiece support diametrically of said first member.
3. A machine tool according to claim 1 comprising second transducer means for determining the rotational position of said first member relative to said housing.
4. A machine tool according to claim 1 comprising third transducer means for determining the rotational position of said workpiece support relative to said second member.
5. A machine tool according to claim 4, wherein said third transducer means additionally determines the rate of rotation of said workpiece support.
6. A machine tool according to claim 1 comprising a third member axially adjustably mounted in said housing, and wherein said first member is rotatably mounted in said third member.
7. A machine tool according to claim 6 comprising fourth transducer means for determining the axial position of said third member relative to said housing.
8. A machine tool according to claim 1 wherein said rotary drive means comprises a hydraulic swash plate motor.
9. A machine tool according to claim 1 comprising a plurality of tool holders distributed about said workpiece support at different angular positions therearound.